(12) United States Patent
Little, III et al.

(10) Patent No.: US 11,846,252 B2
(45) Date of Patent: Dec. 19, 2023

(54) PROPULSION SYSTEM WITH INITIATORS FOR SELECTIVE ACTIVATION OF MULTIPLE ROCKET MOTORS

(71) Applicant: Raytheon Company, Waltham, MA (US)

(72) Inventors: Edward Little, III, El Dorado Hills, CA (US); Bryce Chanes, Tucson, AZ (US); Jacob Pinello-Benavides, Tucson, AZ (US); John Meschberger, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/466,113

(22) Filed: Sep. 3, 2021

(65) Prior Publication Data
US 2023/0072320 A1 Mar. 9, 2023

(51) Int. Cl.
*F02K 9/30* (2006.01)
*F02K 9/94* (2006.01)
(Continued)

(52) U.S. Cl.
CPC ............ *F02K 9/30* (2013.01); *F02K 9/26* (2013.01); *F02K 9/763* (2013.01); *F02K 9/94* (2013.01)

(58) Field of Classification Search
CPC ... F02K 9/26; F02K 9/30; F02K 9/763; F02K 9/94; F02K 9/95
See application file for complete search history.

(56) References Cited

U.S. PATENT DOCUMENTS 2,515,048 A * 7/1950 Lauritsen ............... F02K 9/763
244/3.25
2,841,953 A 7/1958 Teagne, Jr.
(Continued)

FOREIGN PATENT DOCUMENTS

| EP | 0028477 A1 | 5/1981 |
| JP | 2011117448 A | 6/2011 |
| KR | 101388098 B1 | 4/2014 |

OTHER PUBLICATIONS

Pending claims of co-pending U.S. Appl. No. 17/466,245, filed Sep. 3, 2021.
(Continued)

*Primary Examiner* — Kyle Robert Thomas
(74) *Attorney, Agent, or Firm* — Renner, Otto, Boisselle & Sklar

(57) ABSTRACT

A power generation system includes a manifold having multiple plenums, capable of receiving multiple solid rocket motors. Initiators are coupled to the manifold, and are operatively coupled to respective of the plenums, to selectively fire different groups of the rocket motors coupled to respective of the plenums. The rocket motors act in parallel, to provide thrust in a single direction. The initiators may activate ignition charges that are in the plenums. The plenums may be annular plenums, which may be located in an annular manifold. The plenums may be lined with an insulator material. A cover may be used to cover the plenums, and also to receive the rocket motors. The rocket motors may be solid-fuel rocket motors, with propellant grains and nozzles. The individual rocket motors may have separate ignition booster charges coupled to the plenum, which are ignited by the ignition charge.

20 Claims, 4 Drawing Sheets

(51) Int. Cl.
*F02K 9/76* (2006.01)
*F02K 9/26* (2006.01)

(56) References Cited

U.S. PATENT DOCUMENTS

| | | | | |
|---|---|---|---|---|
| 3,166,899 A | * | 1/1965 | Keathley | F02K 9/95 |
| | | | | 60/39.821 |
| 3,217,489 A | * | 11/1965 | King | F02K 9/95 |
| | | | | 60/39.823 |
| 3,273,335 A | * | 9/1966 | Gravlin | F02K 9/95 |
| | | | | 60/39.47 |
| 3,393,639 A | * | 7/1968 | Bolieau | F02K 9/95 |
| | | | | 102/202 |
| 3,555,825 A | | 1/1971 | Dilchert | |
| 3,687,080 A | | 8/1972 | Hoffman | |
| 3,735,985 A | | 5/1973 | Layer et al. | |
| 3,757,692 A | | 9/1973 | Maue | |
| 4,980,601 A | * | 12/1990 | Aoki | H01T 13/20 |
| | | | | 313/143 |
| 5,159,809 A | | 11/1992 | Ciais | |
| 2016/0115905 A1 | | 4/2016 | Suzuki | |

OTHER PUBLICATIONS

Pending claims of co-pending U.S. Appl. No. 17/466,248, filed Sep. 3, 2021.

\* cited by examiner

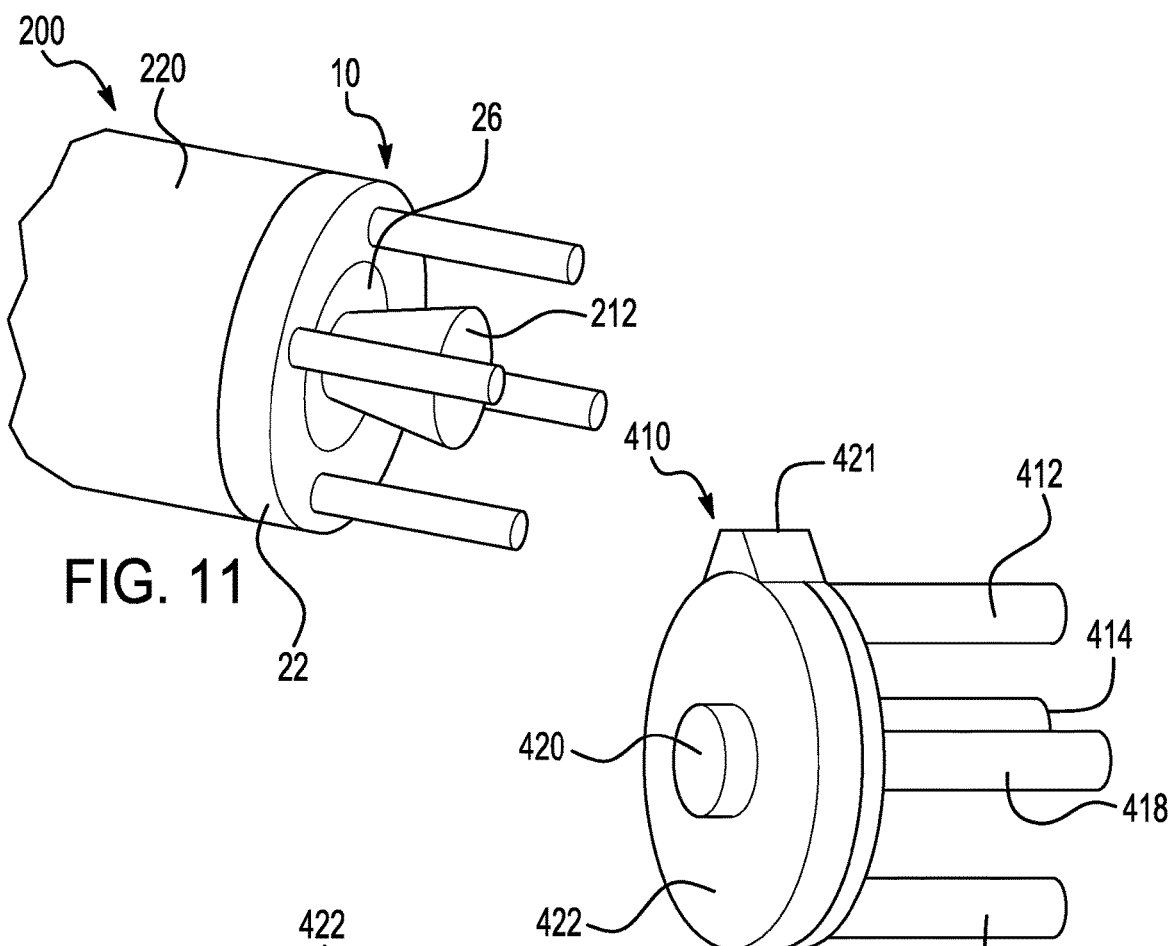
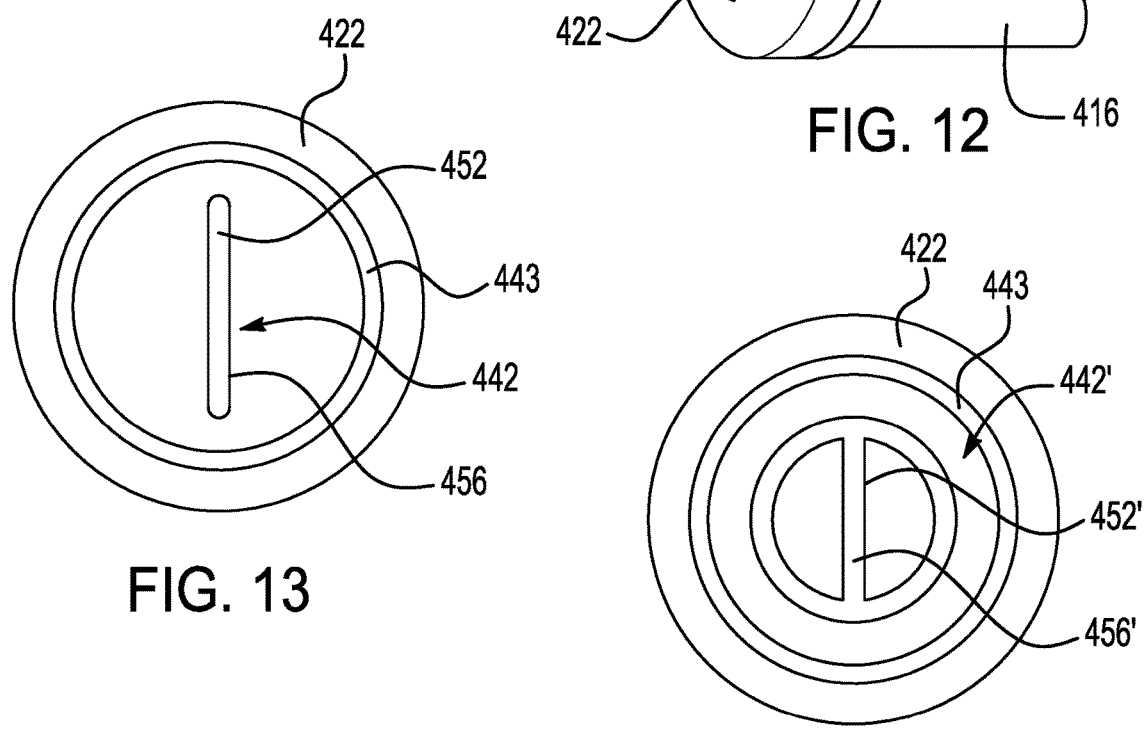

PROPULSION SYSTEM WITH INITIATORS FOR SELECTIVE ACTIVATION OF MULTIPLE ROCKET MOTORS

FIELD

The present disclosure is in the field of devices and methods for propulsion using rocket motors.

BACKGROUND

Rocket motors are a known way to provide thrust. Multi-motor thrust systems are not typically utilized when the thrust system cannot be put on the centerline of the body. In addition, multi-motor ignition systems typically require multiple initiators with complex factors including ignition timing and thrust balancing for successful launch.

SUMMARY

According to an aspect of the disclosure, a propulsion system has a manifold with multiple plenums, with each of the plenums coupled to an initiator, for selectively actuating some of multiple rocket motors that are coupled to the plenum in question.

According to an aspect of the disclosure, multiple first rocket motors are operatively coupled together through a first plenum, and multiple second rocket motors are operatively coupled together through a second plenum.

According to an aspect of the disclosure, a propulsion system includes: a manifold; and multiple initiators operatively coupled to the manifold; wherein the manifold has multiple plenums therein to which multiple rocket motors may be coupled, to provide ignition to different of the multiple rocket motors; and wherein the initiators are to coupled to respective of the multiple plenums, with the multiple plenums coupled to different respective combinations of one or more of the rocket motors.

According to an embodiment of any paragraph(s) of this summary, at least one of the plenums is an annular plenum.

According to an embodiment of any paragraph(s) of this summary, the plenums include a first annular plenum and a second annular plenum, with the first annular plenums radially inward from the second annular plenum.

According to an embodiment of any paragraph(s) of this summary, the manifold is in an annular manifold.

According to an embodiment of any paragraph(s) of this summary, the system further includes ignition material in respective of the plenums, configured to be ignited by the initiators.

According to an embodiment of any paragraph(s) of this summary, the system further includes a cover on manifold.

According to an embodiment of any paragraph(s) of this summary, the cover has mounts for receiving the rocket motors.

According to an embodiment of any paragraph(s) of this summary, the mounts have chambers therein, with ignition boosters in the chambers.

According to an embodiment of any paragraph(s) of this summary, at least one of the plenums is a non-annular plenum.

According to an embodiment of any paragraph(s) of this summary, the system further includes an insulator on inner surfaces of the plenums.

According to an embodiment of any paragraph(s) of this summary, the system further includes the rocket motors, operatively coupled to the plenums.

According to an embodiment of any paragraph(s) of this summary, the rocket motors are circumferentially spaced around the manifold.

According to an embodiment of any paragraph(s) of this summary, each of the rocket motors is only coupled to a single plenum of the plenums.

According to an embodiment of any paragraph(s) of this summary, the plenums include a first plenum and a second plenum; and the rocket motors include a first pair of diametrically-opposed rocket motors coupled to the first plenum, and a second pair of diametrically-opposed rocket motors coupled to the second plenum.

According to an embodiment of any paragraph(s) of this summary, the initiators are configured to be fired independently from one another.

According to an embodiment of any paragraph(s) of this summary, the rocket motors include first rocket motors coupled to a first plenum of the plenums, and second rocket motors coupled to a second plenum of the plenums; and the first rocket motors have different propulsion characteristics than the second rocket motors.

According to an embodiment of any paragraph(s) of this summary, the non-annular plenum includes radial channels.

According to an embodiment of any paragraph(s) of this summary, the non-annular plenum includes circumferential connections between the radial channels.

According to an embodiment of any paragraph(s) of this summary, an initiator is coupled to the non-annular plenum at a center of the non-annular plenum.

According to an embodiment of any paragraph(s) of this summary, the insulator is a silicone material.

According to an embodiment of any paragraph(s) of this summary, the rocket motors are threadedly coupled to mounts on a cover on the manifold.

According to another aspect of the disclosure, a flight vehicle includes: a fuselage; and a propulsion system coupled to the fuselage, the propulsion system including: a manifold; and multiple initiators operatively coupled to the manifold; wherein the manifold has multiple plenums therein to which multiple rocket motors may be coupled, to provide ignition to different of the multiple rocket motors; and wherein the initiators are to coupled to respective of the multiple plenums, with the multiple plenums coupled to different respective combinations of one or more of the rocket motors.

According to an embodiment of any paragraph(s) of this summary, the manifold is an annular manifold with a central opening; and the flight vehicle further includes a jet engine making use of the central opening.

According to yet another aspect of the disclosure, a method of operating a propulsion system includes the steps of: selectively igniting ignition charges in any of multiple plenums in a manifold; and using pressurized gasses from the plenums in which ignition charges have been ignited, to ignite multiple rockets that are operatively coupled to individual of the plenums in which ignition charges have been ignited.

According to an embodiment of any paragraph(s) of this summary, the selectively igniting includes igniting multiple of the ignition charges sequentially.

According to an embodiment of any paragraph(s) of this summary, the selectively igniting includes igniting multiple of the ignition charges simultaneously.

According to an embodiment of any paragraph(s) of this summary, the manifold is made of metal.

According to an embodiment of any paragraph(s) of this summary, wherein the manifold is made of steel.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

FIG. 11 is an oblique view of a portion of a flight vehicle that includes the propulsion system of FIG. 1.

FIG. 12 is an oblique view of a propulsion system in accordance with another embodiment of the disclosure.

FIG. 13 is a plan view of one configuration of the manifold of the propulsion system of FIG. 12.

FIG. 14 is a plan view of another configuration of the manifold of the propulsion system of FIG. 12.

DETAILED DESCRIPTION

A power generation system includes a manifold having multiple plenums, capable of receiving multiple solid rocket motors. Initiators are coupled to the manifold, and are operatively coupled to respective of the plenums, to selectively fire different groups of the rocket motors coupled to respective of the plenums. The rocket motors act in parallel, to provide thrust in a single direction. The initiators may activate ignition charges that are in the plenums. The plenums may be annular plenums, which may be located in an annular manifold. The plenums may be lined with an insulator material. A cover may be used to cover the plenums, and also to receive the rocket motors. The rocket motors may be solid-fuel rocket motors, with propellant grains and nozzles. The individual rocket motors may have separate ignition booster charges coupled to the plenum, which are ignited by the ignition charge and which in turn ignite the propellant grains.

Figure 1:
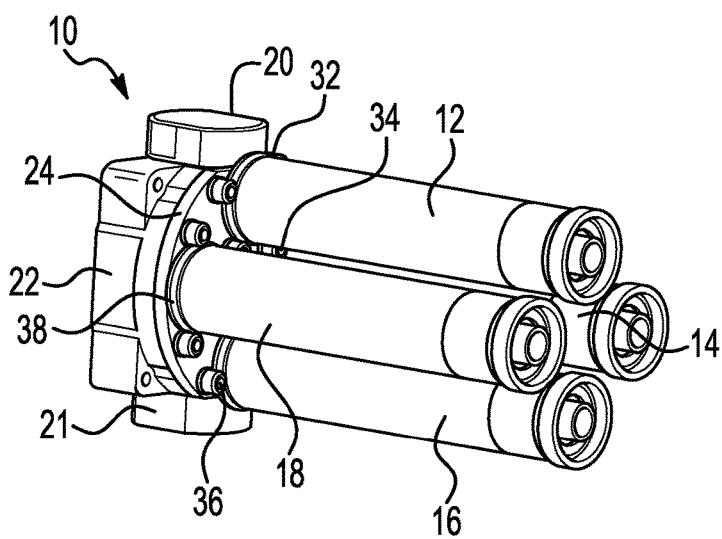
FIG. 1 is an oblique view of a propulsion system in accordance with an embodiment of the disclosure.

FIG. 1 shows a power generation system 10 that includes multiple solid rocket motors 12, 14, 16, and 18, which are activated (ignited) by multiple initiators 20 and 21. The rocket motors 12-18 and the initiators 20 and 21 are attached to a manifold 22. As described further below includes passages (plenums) in the manifold 22 the initiators 20 and 21, to different combinations of the rocket motors 12-18.

A cover 24 on the manifold 22 encloses and partially defines the plenum, and provides mounts 32, 34, 36, and 38 to which the rocket motors 12-18 are secured. The cover 24 and the manifold 22 may be made of suitable metal, such as steel, aluminum, titanium, or other suitable metals (or non-metals).

Figure 2:
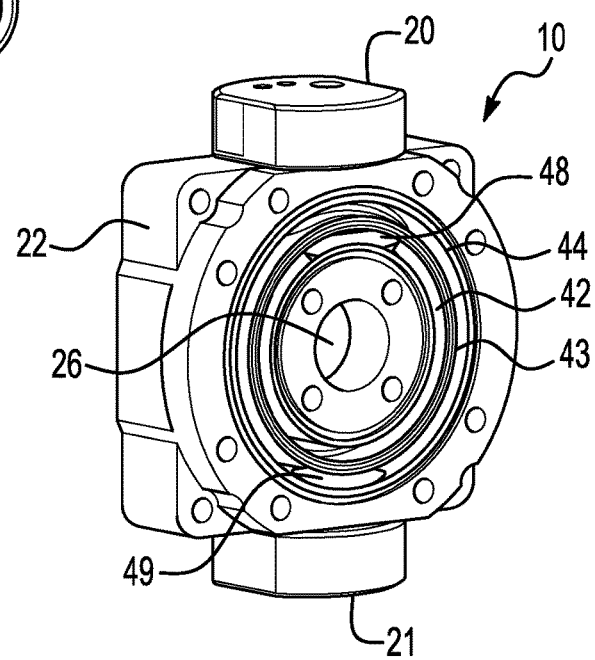
FIG. 2 is an oblique view of part of the propulsion system of FIG. 1.

In the illustrated embodiment the manifold 22 has an annular shape, with material of the manifold 22 around a central opening 26 (FIG. 2). In other embodiments, some of which are described below, the manifold 22 may have other shapes.

Figure 3:
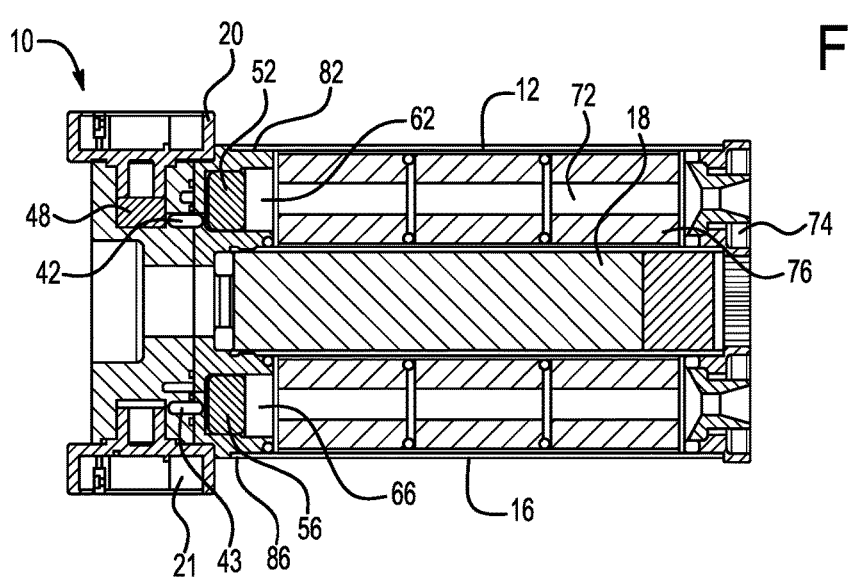
FIG. 3 is a side sectional view of the propulsion system of FIG. 1.

Referring in addition to FIGS. 2 and 3, further details are shown of inner parts of the power generation system 10. FIG. 2 shows a pair of annular plenums 42 and 43 that is in the manifold 22, and that provide fluid communication to different combinations of the rocket motors 12-18. The annular plenum 42 is radially inward of the annular plenum 43. In the illustrated embodiment the diametrically-opposed rocket motors 12 and 16 are coupled to the annular plenum 42, and the diametrically-opposed rocket motors 14 and 18 are coupled to the annular plenum 43. Alternative arrangements are possible for coupling multiple motors to multiple plenums.

The plenums 42 and 43 may be lined with a thermal insulator material 44, which aids in protecting the manifold 22 and the cover 24 from erosion from hot gasses, or from other effects of exposure to hot gas (such as from heating). An example of a suitable thermal insulating material is silicone RTV, although a variety of other suitable materials may be used as alternatives. The insulator material 44 only needs to be operative for during the transient time when operation of the rocket motors 12-18 is initiated.

Ignition charges 48 and 49 are located within the plenums 42 and 43. The respective initiators 20 and 21 are able to independent ignite the ignition charges 48 and 49. Hot pressurized gasses from the ignited ignition charges 48 and 49 go through the respective plenums 42 and 43 to ignite the rocket motors 12-18 that are coupled to that plenum. The initiators 20 and 21 may ignite the ignition charges 48 and 49 using any suitable mechanism, including chemical ignition using an energetic chemically-reacting starter material, or electrical ignition, such as with use of a bridge wire. The ignition charges 48 and 49 may be a length of igniter material or rapid deflagration chord.

The hot gasses from the ignition charges 48 and 49 ignite ignition booster charges in the corresponding rocket motors 12-18, such as the charges 52 and 56 (FIG. 3) that correspond to respective of the rocket motors 12 and 16. The ignition booster charges 52 and 56 may be located in chambers, such as chambers 62 and 66, that are in the mounts 32-38 that receive the rocket motors 12-18.

With reference to the rocket motor 12, the ignition booster charge 32 produces hot ignition products that enter a combustion chamber 72 in a solid fuel grain 74, and ignite the grain 74. The burning solid fuel 74 produces pressurized gasses that pass through a nozzle 76 on a distal end of the rocket motor 12, producing thrust. Similar processes occur in the other rocket motors 14-18.

The mounts 32-38 may have threaded connections, such as externally threaded connectors 82 and 86, that allow the rocket motors 12-18 to be threaded onto the mounts 32-38. The mounts 32-38 may receive any of a variety of different types of rocket motors 12-18, for example having different propellants, different combustion chamber configurations, and/or other differences, for example providing different amounts of thrust and/or different thrust profiles.

The illustrated embodiment has four rocket motors 12-18, evenly distributed around the manifold 22. Alternatively the power generation system 10 may have a different number of rocket motors (greater or lesser), although it is desirable that the rocket motors be symmetric with regard to a center of the system.

The power generation system 10 has many advantages, for example flexibility in configuration, reduction in number of parts, and ensuring simultaneity in ignition of the rocket motor pairs 12 and 16, and 14 and 18. In addition the coupling of the rocket motors 12 and 16 through the plenum 42, and the coupling of the rocket motors 14 and 18 through the plenum 43, may aid in equilibrating operation of the rocket motors 12-18 with each other, for example in avoiding pressure differences between the rocket motors of the rocket motor pairs 12 and 16, and 14 and 18. Any or all of these benefits may be achieved in a particular system.

The rocket motors 12-18 may all be identical in operation, or alternatively may have different propulsion characteristics. For example the rocket motors 12 and 16 may have different propulsion characteristics from the rocket motors 14 and 18. The rocket motors may have different burn times, different thrust outputs, different propellants, different mounts of propellant, different grain configurations, and/or different nozzle configurations, to give a few examples of different characteristics and/or sources of different characteristics.

The use of rocket motors with different propulsion characteristics may be useful in allowing flexibility in providing thrust. This may be done by selectively igniting one or the other set of rocket motors, with the selection and the timing of the firings affecting the thrust profile of the propulsion system 10. The firings may be separate, simultaneous, or partially overlapping in time.

In the illustrated embodiment the plenums 42 and 43 are each linked to a respective pair of diametrically-opposed rocket motors. Alternatively multiple plenums may be coupled to different numbers of rocket motors, and/or rocket motors in different configurations, although it will be appreciated that it may be advantageous to have the rocket motors symmetrically located around a central axis of the propulsion system.

In other arrangements there may be more than two plenums, used for activating more than two sets of rocket motors. In some embodiments the same one or more rocket motors may be coupled to multiple plenums.

Figure 4:
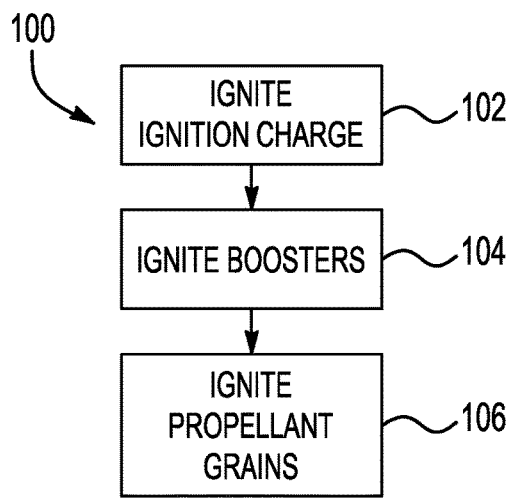
FIG. 4 is a high-level flowchart of a method of using a propulsion system, such as the system of FIG. 1, according to an embodiment of the disclosure.
Figure 5:
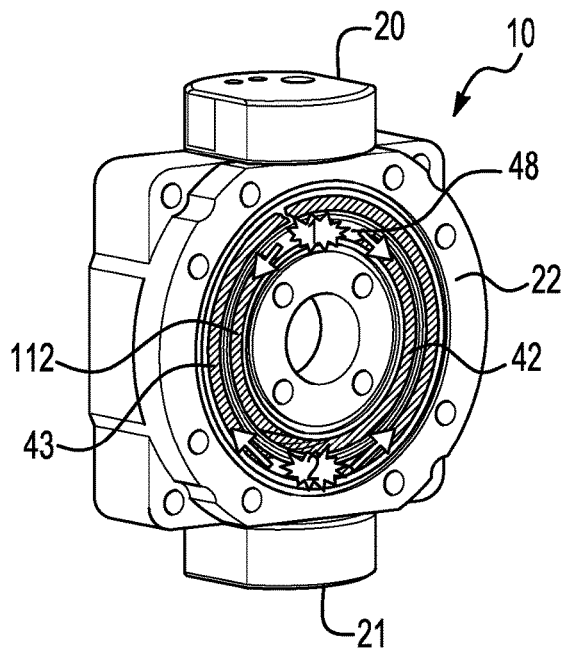
FIG. 5 is an oblique view of the propulsion system of FIG. 1, at a first step of the method of FIG. 4.
Figure 6:
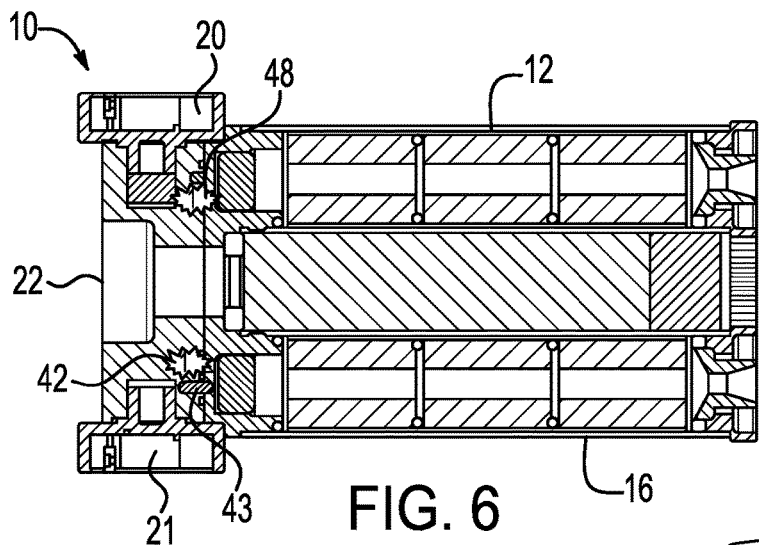
FIG. 6 is a side sectional view of the propulsion system of FIG. 1, at the first step of the method of FIG. 4.

FIG. 4 shows high-level steps of a method 100 of operating the system 10 (FIG. 1), with FIGS. 5-10 illustrating the steps of the method 100. In step 102, illustrated in FIGS. 5 and 6, the initiator 20 sets off the ignition charge 48, filling the plenum 42 with hot gasses 112. In the illustrated embodiment only the initiator 20 is activated, while the initiator 21 is not activated, saving the rocket motors 14 and 18 for possible filing later. However, it is possible to activate both of the initiators 20 and 21 at the same time, or overlapping in time.

Figure 7:
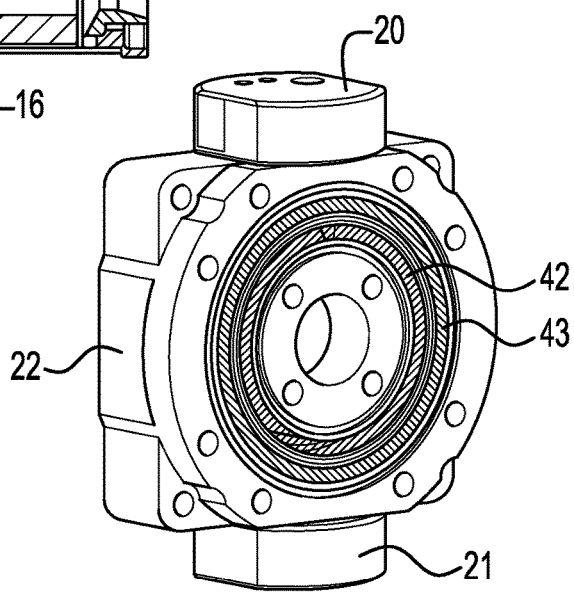
FIG. 7 is an oblique view of the propulsion system of FIG. 1, at a second step of the method of FIG. 4.
Figure 8:
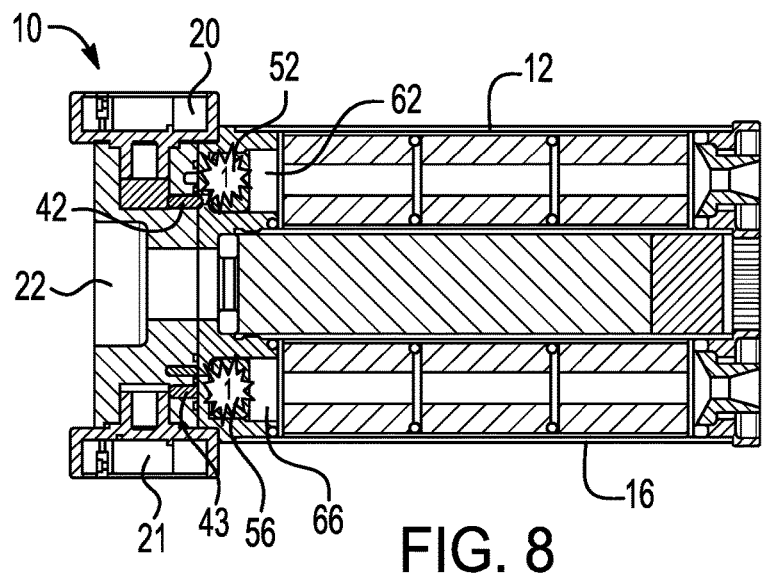
FIG. 8 is a side sectional view of the propulsion system of FIG. 1, at the second step of the method of FIG. 4.

FIGS. 7 and 8 illustrate step 104, where hot gasses 112 have fully filled the plenum 42. The hot gasses 112 enter the chambers 62 and 66, where the hot gasses 112 ignite the booster charges 52 and 56.

Figure 9:
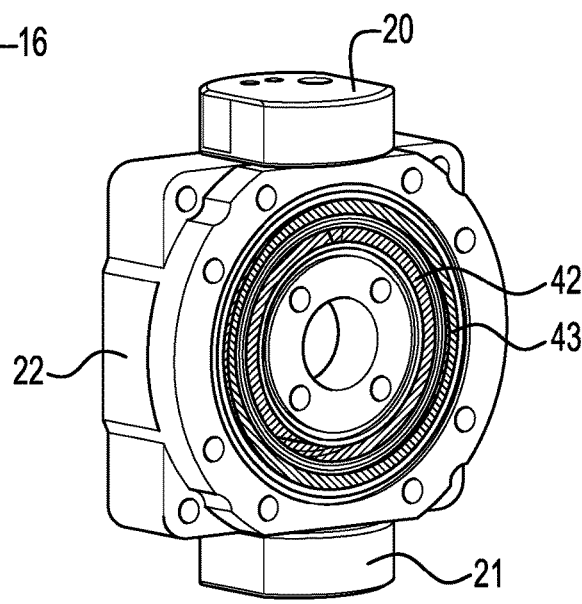
FIG. 9 is an oblique view of the propulsion system of FIG. 1, at a third step of the method of FIG. 4.
Figure 10:
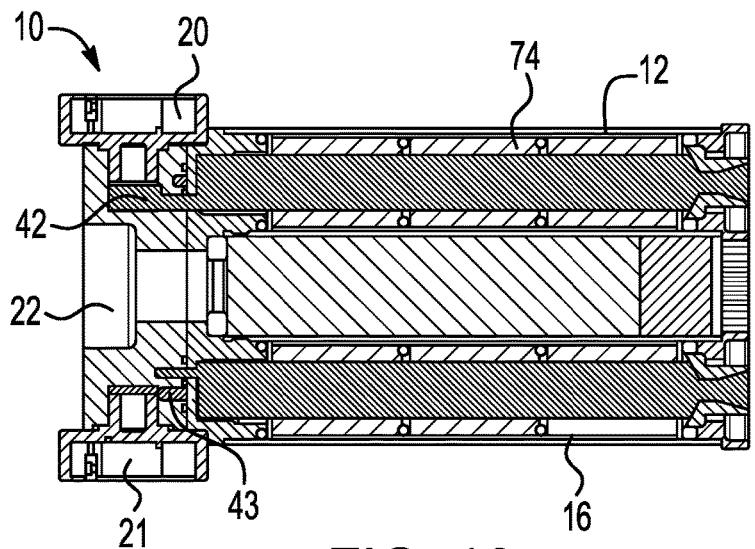
FIG. 10 is a side sectional view of the propulsion system of FIG. 1, at the third step of the method of FIG. 4.

FIGS. 9 and 10 illustrate step 106, with the booster charges 52 and 56 igniting the propellent grains of the rocket motors 12 and 16. Similar parts simultaneously ignite the other rocket motors as well. The rocket motors 12-18 produce thrust and, as mentioned earlier, the fluid communication of the rocket motors 12-18 through the plenum may tend to equalize the operation of the different rocket motors 12-18.

FIG. 11 shows one possible use for the propulsion system 10, as part of a missile or other flight vehicle 200. The missile 200 may have the propulsion system 10 used to provide propulsive thrust in conjunction with another propulsion device 212 that is located in the central opening 26 in the manifold. For example the additional propulsion device 212 may be a jet engine.

FIG. 12 shows an alternative embodiment, a propulsion system 410 with a disk-shaped manifold 422, having rocket motors 412, 414, 416, and 418 attached thereto. An initiator 420 is attached to the manifold 422 at the center of a major surface of the manifold 422, while an initiator 421 is attached to an outer surface of the manifold 422. The initiator 420 is able to activate the rocket motors 412 and 416 through a non-annular inner plenum in the manifold, while the initiator 421 is coupled to an annular outer plenum 443 (FIGS. 13 and 14). In one configuration, illustrated in FIG. 13, an inner plenum 442 is oriented radially, with radial passages 452 and 456 extending from a center of the plenum 442 to locations where the rockets 412 and 416 are connected to the manifold 422.

In another embodiment, illustrated in FIG. 14, an inner plenum 442' has a circumferential passage 460 in addition to radial passages 452' and 456', forming a spokes-and-wheel arrangement. The inner plenum 442' may provide for better pressure equalization between different of the rockets 412 and 416 (FIG. 12).

Further variations are possible regarding the embodiments of FIGS. 12-14. For instance in another embodiment (not illustrated) there may be an additional rocket motor on the longitudinal axis of the propulsion system 410. Other configurations are possible, such as multiple rocket motors at each of multiple different radial distances from a longitudinal axis.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A propulsion system comprising:
   a manifold; and
   multiple initiators operatively coupled to the manifold;

wherein the manifold has multiple plenums therein to which multiple rocket motors may be coupled, to provide ignition to different of the multiple rocket motors, wherein the multiple plenums are separated from each other and are not in fluid communication; and wherein the initiators are to coupled to respective of the multiple plenums, with the multiple plenums coupled to different respective combinations of one or more of the multiple rocket motors.

2. The propulsion system of claim 1, wherein at least one of the multiple plenums is an annular plenum.

3. The propulsion system of claim 1, wherein the multiple plenums include a first annular plenum and a second annular plenum, with the first annular plenum radially inward from the second annular plenum.

4. The propulsion system of claim 1, wherein the manifold is in an annular manifold.

5. The propulsion system of claim 1, further comprising ignition material in respective of the multiple plenums, configured to be ignited by the initiators.

6. The propulsion system of claim 1, further comprising a cover on the manifold.

7. The propulsion system of claim 6, wherein the cover has mounts for receiving the rocket motors.

8. The propulsion system of claim 6, wherein the mounts have chambers therein, with ignition boosters in the chambers.

9. The propulsion system of claim 1, wherein at least one of the multiple plenums is a non-annular plenum.

10. The propulsion system of claim 1, further comprising an insulator on inner surfaces of the multiple plenums.

11. The propulsion system of claim 1, further comprising the rocket motors, operatively coupled to the multiple plenums.

12. The propulsion system of claim 11, wherein the rocket motors are circumferentially spaced around the manifold.

13. The propulsion system of claim 11, wherein each of the rocket motors is only coupled to a single plenum of the multiple plenums.

14. The propulsion system of claim 11, wherein the multiple plenums include a first plenum and a second plenum; and wherein the rocket motors include a first pair of diametrically-opposed rocket motors coupled to the first plenum, and a second pair of diametrically-opposed rocket motors coupled to the second plenum.

15. The propulsion system of claim 11, wherein the initiators are configured to be fired independently from one another.

16. The propulsion system of claim 11, wherein the rocket motors include first rocket motors coupled to a first plenum of the multiple plenums, and second rocket motors coupled to a second plenum of the multiple plenums; and wherein the first rocket motors have different propulsion characteristics than the second rocket motors.

17. A flight vehicle comprising:
a fuselage; and
a propulsion system coupled to the fuselage, the propulsion system including:
a manifold; and
multiple initiators operatively coupled to the manifold;
wherein the manifold has multiple plenums therein to which multiple rocket motors may be coupled, to provide ignition to different of the multiple rocket motors, wherein the multiple plenums are separated from each other and are not in fluid communication; and wherein the initiators are to coupled to respective of the multiple plenums, with the multiple plenums coupled to different respective combinations of one or more of the multiple rocket motors.

18. A method of operating a propulsion system, the method comprising:
selectively igniting ignition charges in any of multiple plenums in a manifold, wherein the multiple plenums are separated from each other and are not in fluid communication; and
using pressurized gasses from the multiple plenums in which ignition charges have been ignited, to ignite multiple rockets that are operatively coupled to individual of the multiple plenums in which ignition charges have been ignited.

19. The method of claim 18, wherein the selectively igniting includes igniting multiple of the ignition charges sequentially.

20. The method of claim 18, wherein the selectively igniting includes igniting multiple of the ignition charges simultaneously.

* * * * *